UNITED STATES PATENT OFFICE.

ALPHEUS FAY, OF LOUISVILLE, KENTUCKY.

METHOD OF TREATING MILK OR CREAM AND BUTTER.

No. 897,277.  Specification of Letters Patent.  Patented Sept. 1, 1908.

Application filed May 28, 1908. Serial No. 435,560.

*To all whom it may concern:*

Be it known that I, ALPHEUS FAY, a citizen of the United States, residing at Louisville, in the county of Jefferson and State of Kentucky, have invented a certain new and useful Method of Treating Milk or Cream and Butter, of which the following is a specification.

The object of my invention is to provide an improved method of treating milk to obtain cream and butter, and an improved milk product.

My invention consists in the method hereinafter described and claimed.

In carrying out my process fresh sweet milk is placed in a mechanical cream separator in which the same is agitated, while the air is being passed through it. Such a separator is illustrated in my application for cream and butter separators filed on May 16, 1907, Serial Number 374,011. The milk is subjected to the action of the separator at a temperature of from 40° to 50° Fahrenheit, for from three to five minutes, when the treatment is discontinued and the milk allowed to come to rest. By the mechanical agitation and passage of air the cream is rendered free to rise immediately which it will do in from five to ten minutes after the milk is come to rest. This seems to be due to the fact that the mechanical agitation serves to free the cream globules from mechanical entanglement with the milk and tends to collect them in larger globules. This naturally leaves the cream globules free to rise under the combined influence of the passing air and gravity. The "skimmed" milk is then drawn off by a faucet near the bottom of the separator. It is obvious that by regulating the quantity of skimmed milk drawn off, the richness of the cream obtained may be varied as desired. A good quality of cream is about one-fifth the volume of ordinary milk. The cream thus obtained may be used in the usual manner or may be further treated in the separator without removal, to separate the butter therefrom. This will ordinarily take from three to five minutes and should be done at from 55° to 60° Fahrenheit. This will cause the butter to separate and rise to the top of the cream, whence it may be removed and worked in the usual manner. The cream residue which is still fresh and sweet and contains substantially all of the solid matter in the cream except the butter fat, may be remixed with the skimmed milk to form a milk of fine flavor and taste and containing substantially all of the solids originally in the milk except the butter fat.

Good results may be obtained by mechanical agitation without the passage of air and then permitting the milk to come to rest. In this case the mechanical agitation frees and combines the cream globules, while the force of gravity forces them to the top, although not so quickly as by the passage of air as the friction of passing air tends to carry the cream globules to the top.

What I claim as new and desire to secure by Letters Patent is:

1. The method of treating milk which consists in first removing cream from the milk while fresh; then removing butter from the cream while fresh; and then remixing the cream and milk residues, substantially as specified.

2. The method of treating milk which consists in first removing cream from the milk while fresh; and at a temperature below the souring point, then removing butter from the cream while fresh, and at a temperature below the souring point, and then remixing the cream and milk residues, substantially as specified.

ALPHEUS FAY.

Witnesses:
BRAYTON G. RICHARDS,
PETER YUNG, Jr.